US008184310B2

(12) United States Patent
Nemoto

(10) Patent No.: US 8,184,310 B2
(45) Date of Patent: May 22, 2012

(54) APPROVAL WORKFLOW MANAGEMENT SYSTEM AND PRINTING APPARATUS WITH CONTROL OVER FILE EDITING RESTRICTIONS

(75) Inventor: Junko Nemoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 653 days.

(21) Appl. No.: 12/361,337

(22) Filed: Jan. 28, 2009

(65) Prior Publication Data

US 2009/0190171 A1  Jul. 30, 2009

(30) Foreign Application Priority Data

Jan. 30, 2008  (JP) ................................. 2008-019055

(51) Int. Cl.
*G06F 3/12* (2006.01)
*G06F 15/16* (2006.01)
(52) U.S. Cl. ........................... 358/1.14; 358/1.15; 726/4
(58) Field of Classification Search .................. None
See application file for complete search history.

(56) References Cited

U.S. PATENT DOCUMENTS

| 6,185,563 | B1 | 2/2001 | Hino | |
|---|---|---|---|---|
| 6,956,662 | B1 * | 10/2005 | Kamimura | 358/1.15 |
| 7,526,812 | B2 * | 4/2009 | DeYoung | 726/2 |
| 7,861,282 | B2 * | 12/2010 | Kakigi | 726/1 |
| 7,882,559 | B2 * | 2/2011 | Imai | 726/21 |
| 2007/0043864 | A1 * | 2/2007 | Nemoto | 709/225 |
| 2007/0146768 | A1 * | 6/2007 | Isoda | 358/1.14 |
| 2008/0098455 | A1 * | 4/2008 | Hirahara | 726/1 |
| 2009/0222914 | A1 * | 9/2009 | Ozawa | 726/21 |
| 2009/0307745 | A1 * | 12/2009 | Inose | 726/1 |
| 2010/0002248 | A1 * | 1/2010 | Nuggehalli et al. | 358/1.14 |
| 2010/0095349 | A1 * | 4/2010 | Motoyama | 726/1 |
| 2010/0242085 | A1 * | 9/2010 | Dutta et al. | 726/1 |

FOREIGN PATENT DOCUMENTS

| JP | H11-085598 | A | | 3/1999 |
| JP | 2001-101324 | A | | 4/2001 |
| JP | 2005-004549 | A | | 1/2005 |
| JP | 2005004549 | A | * | 1/2005 |

* cited by examiner

*Primary Examiner* — Scott A Rogers
(74) *Attorney, Agent, or Firm* — Carter, DeLuca, Farrell & Schmidt LLP

(57) ABSTRACT

An approval workflow management system capable of preventing a mismatch from being caused between a document of which the contents have been confirmed for approval, and an electronic document stored in a file server, for approval, thereby enhancing the reliability of an approval workflow. The approval workflow system is formed by connecting client computers, MFPs, a file server, and an approval information management server to a network. When an MFP receives a request for printing a file, from the client computer, the MFP requests the file server to restrict editing the file, and the approval information management to approve the file. When the approval information management server notifies the MFP that approval of the file has been successful, the MFP requests the file server to cancel restriction of editing the file.

4 Claims, 14 Drawing Sheets

FIG. 7

| DOCUMENT IDENTIFIER | APPROVER (ID) | UPDATED DATE & TIME | APPROVED/ UNAPPROVED |
|---|---|---|---|
| 001@server1 | User A | 2007/06/15 | ○ |
| 001@server1 | User D | 2007/06/22 | ○ |
| 001@server1 | User C | — | — |
| 100@server2 | User G | — | — |
| 100@server2 | User C | — | — |
| 012@server1 | User G | 2007/03/28 | ○ |
| 012@server1 | User B | 2007/04/07 | ○ |
| 012@server1 | User A | 2007/04/15 | × |
| 012@server1 | User E | — | — |
| 012@server1 | User C | — | — |

FIG. 8

DOCUMENT IDENTIFIER:    012@server1

REQUEST (APPROVAL/REJECTION):    APPROVAL

APPROVAL-RELATED PROCESS-REQUESTING USER: User B

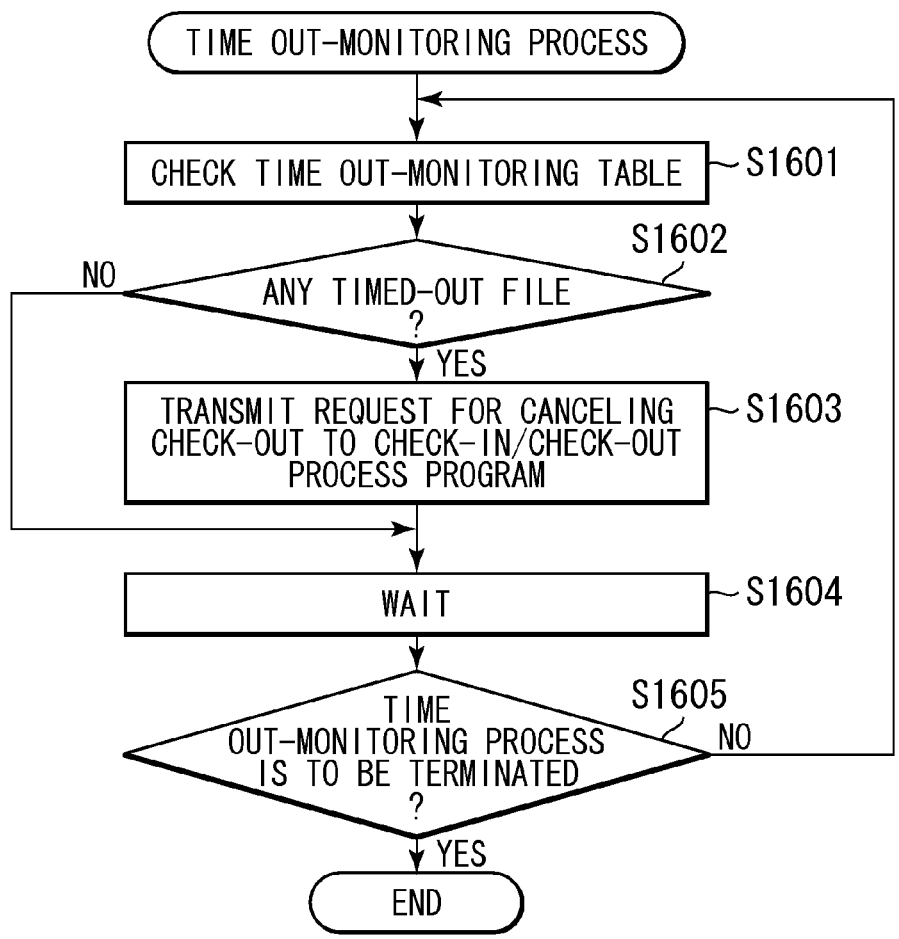

APPROVAL WORKFLOW MANAGEMENT SYSTEM AND PRINTING APPARATUS WITH CONTROL OVER FILE EDITING RESTRICTIONS

BACKGROUND OF THE INVENTION

1. Field of the Invention

The present invention relates to an approval workflow management system, and more particularly to an approval workflow management system that uses a printing apparatus capable of enhancing reliability of an approval flow by prohibiting editing of files in response to user's file operation, the printing apparatus, and a computer-readable storage medium.

2. Description of the Related Art

In recent years, an approval workflow management system (electronic approval system) has come to be widely used by companies for approval workflow.

In the approval workflow file system, a file server for storing files, client computers for editing files, and printing apparatuses for printing out files are connected to each other via a network, for execution of an electronic approval workflow on the files.

An approval process, which has conventionally been performed by circulating a physical document between a plurality of staff members and putting approval seals on the document, is now performed as follows: According to an approval workflow controlled by a management server, a shared electronic document stored in the file server is confirmed using a client computer connected to the file server via the network, and an electronic approval process or rejection process is performed on the document (see e.g. Japanese Patent Laid-Open Publication No. 2001-101324).

In performing the above-described approval process using an electronic document, generally, a user as an approver prints out the electronic document by the printing apparatus connected to the network so as to confirm the contents of the document. The user confirms the details of the approval by the output document, and requests the management server to execute the approval process or rejection process from the client computer or the printing apparatus.

This causes a time lag between when the user prints out the file and when the management server performs the approval process, and there is a fear that the contents of the electronic document stored in the file server are changed during the time lag.

On the other hand, when an electronic document is shared between a plurality of users, there is widely employed a control technique of prohibiting the same document from being doubly updated simultaneously by more than one user.

Japanese Patent Laid-Open Publication No. H11-85598 discloses a control technique in which a file server storing shared electronic documents performs the check-in/check-out management of the documents. Once the file server accepts a request for checking out one of the shared electronic documents from a client, the file server prohibits the document from being newly checked out until the document is checked in or a request for canceling the check-out is received.

The above-described method makes it possible for a user to request the file server to explicitly check out an electronic document to thereby prohibit another user from editing the electronic document.

Further, there has also been proposed a technique in which a policy server that manages access rights to electronic documents is provided so as to limit user access to the documents for viewing, editing, etc. and the policy server prohibits editing of electronic documents for approval (e.g. in Japanese Patent Laid-Open Publication No. 2005-4549).

As described above, in the electronic approval-based approval workflow, there is a possibility that an electronic document in the file server has its contents edited by a user other than an approver between when the approver prints out the electronic document for confirmation using the printing apparatus and when the approver actually executes the approval process. If such an event occurs, the document based on which the approver determined the approvability thereof and the electronic document subjected to the approval process become different in contents. Therefore, the above-described technique has the problem that there is a possibility of being incapable of properly performing the approval process.

Further, there has also been proposed a technique in which in the case of a file server storing electronic documents being provided with a check-in/check-out management function, an approver checks out an electronic document for approval when printing out the same, to thereby prohibit the document for approval from being edited by another user. However, this technique requires the approver to explicitly perform a check-out process and a check-out-canceling process when the document is printed out and when the same is approved, respectively, which is troublesome for the user.

Also in the case of the technique proposed in Japanese Patent Laid-Open Publication No. 2005-4549 in which the policy server that manages access rights to electronic documents is provided so as to limit user access to the documents for viewing, editing, etc. and the policy server prohibits editing of electronic documents for approval, an approver is required to apply an edit-prohibiting policy to an electronic document for approval and cancel the application of the policy, which degrades usability.

SUMMARY OF THE INVENTION

The present invention provides an approval workflow management system, a printing apparatus, and a computer-readable storage medium, which are capable of preventing a mismatch from being caused between a document of which the contents have been confirmed for approval, and an electronic document stored in a file server, for approval, thereby enhancing the reliability of an approval workflow.

In a first aspect of the present invention, there is provided an approval workflow management system in which a file server that stores files and controls whether to permit or restrict access to the files, a printing apparatus that prints out files stored in the file server, and an approval information management server that manages approval information which is indicative of an approval-related state of each file stored in the file server, are connected to a network, the printing apparatus comprising a first request unit adapted to request, in response to acceptance of a request for printing one of the files stored in the file server, the file server to restrict editing the one of the files stored in the file server, a second request unit adapted to request the approval information management server to approve the file, and a third request unit adapted to request, in response to receiving from the approval information management server a notification that a process for approval responsive to the request for approval of the file by the second request unit has been successful, the file server to cancel restriction of editing the file.

In a second aspect of the present invention, there is provided a printing apparatus that is connected to a file server that stores files and controls whether to permit or restrict access to the files, and an approval information management server that manages approval information which is indicative of an approval-related state of each file stored in the file server, via a network, comprising a first request unit adapted to request, in response to acceptance of a request for printing one of the files stored in the file server, the file server to restrict editing the one of the files stored in the file server, a second request unit adapted to request the approval information management server to approve the file, and a third request unit adapted to request, in response to receiving from the approval information management server a notification that a process for approval responsive to the request for approval of the file by the second request unit has been successful, the file server to cancel restriction of editing the file.

In a third aspect of the present invention, there is provided a method of controlling a printing apparatus that is connected to a file server that stores files and controls whether to permit or restrict access to the files, and an approval information management server that manages approval information which is indicative of an approval-related state of each file stored in the file server, via a network, the method comprising requesting, in response to acceptance of a request for printing one of the files stored in the file server, the file server to restrict editing the one of the files stored in the file server, requesting the approval information management server to approve the file, and requesting, in response to receiving from the approval information management server a notification that a process for approval responsive to the request for approval of the file has been successful, the file server to cancel restriction of editing the file.

In a fourth aspect of the present invention, there is provided a computer-readable storage medium that stores a control program for causing a computer to execute a method of controlling a printing apparatus that is connected to a file server that stores files and controls whether to permit or restrict access to the files, and an approval information management server that manages approval information which is indicative of an approval-related state of each file stored in the file server, via a network, the method comprising requesting, in response to acceptance of a request for printing one of the files stored in the file server, the file server to restrict editing the one of the files stored in the file server, requesting the approval information management server to approve the file, and requesting, in response to receiving from the approval information management server a notification that a process for approval responsive to the request for approval of the file has been successful, the file server to cancel a restriction of editing the file.

According to the approval workflow management system of the present invention, it is possible to prevent a mismatch from being caused between a document of which the contents have been confirmed for approval and an electronic document stored in a file server, for approval. This makes it possible to enhance the reliability of an approval workflow.

The features and advantages of the invention will become more apparent from the following detailed description taken in conjunction with the accompanying drawings.

BRIEF DESCRIPTION OF THE DRAWINGS

FIG. 7 is a view showing an example of approval information stored in the approval information management server.

FIG. 8 is a view showing an example of an approval-related request stored in the file server.

FIG. 16 is a flowchart of a time out-monitoring process executed by the file server.

FIG. 17 is a view showing an example of a time out-monitoring table stored in the file server.

DETAILED DESCRIPTION OF THE EMBODIMENTS

The present invention will now be described in detail below with reference to the accompanying drawings showing embodiments thereof.

Figure 1:
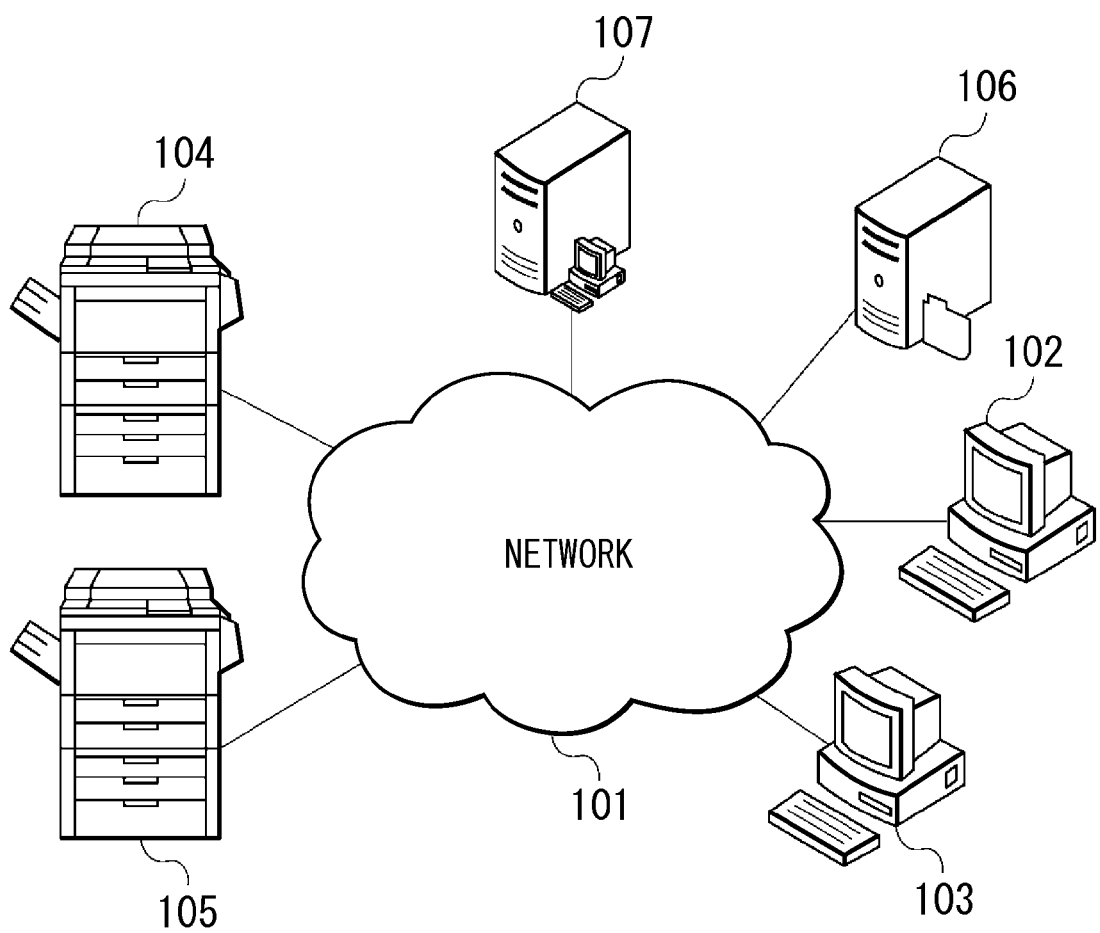
FIG. 1 is a configuration diagram of an approval workflow system according to an embodiment of the present invention.

FIG. 1 is a configuration diagram of an approval workflow system according to an embodiment of the present invention.

Referring to FIG. 1, the approval workflow system is comprised of client computers 102 and 103 used by general users, multifunction peripherals (printing apparatuses: hereinafter referred to as the "MFPs") 104 and 105, a file server 106, and an approval information management server 107, which are connected to a network 101.

The MFPs 104 and 105 as printing apparatuses are each provided with an authentication section (authenticating unit) 219, referred to hereinafter, for performing user authentication. The approval information management server 107 is provided with an approver-determining function for determines whether or not the result of authentication by the authenticating unit matches an approver registered in approval information 700, referred to hereinafter.

The network 101 supports a TCP/IP protocol, for example. The approval information management server 107 manages an approval flow for each of documents in the file server 106, and realizes an approval workflow for the documents.

The approval workflow system stores files created by the client computers 102 and 103 in the file server 106 via the network 101. Further, the approval workflow system stores image data generated from originals read by scanner sections 222, referred to hereinafter, of the MFPs 104 and 105, in the file server 106, via the network 101.

Users are capable of performing display, edit, and so forth of the files stored in the file server 106 on the client computers 102 and 103. Further, users are capable of performing display, printout, and so forth of the files stored in the file server 106 by the MFPs 104 and 105.

Now, let it be assumed that document identifiers that are capable of uniquely identifying the files stored in the file server 106 are assigned to the files during creation of the files. The file server 106 controls file operations based on access control information, described hereinafter, to which information indicative of whether or not accesses to the file server 106 and the files are allowed are registered in a manner associated with the respective files.

The approval information management server 107 is capable of preserving approved states of the files stored in the file server 106, thereby realizing the approval workflow for the files.

Of course, FIG. 1 only shows the concept of the general configuration of the approval workflow system, and the image forming apparatuses (image processing apparatuses) are not necessarily required to be the MFPs 104 and 105, but printers, scanners, etc. as single separate devices may be connected to the network 101. Further, it is to be understood that the file server 106 and the approval information management server 107 may be realized by the same server.

Figure 2:
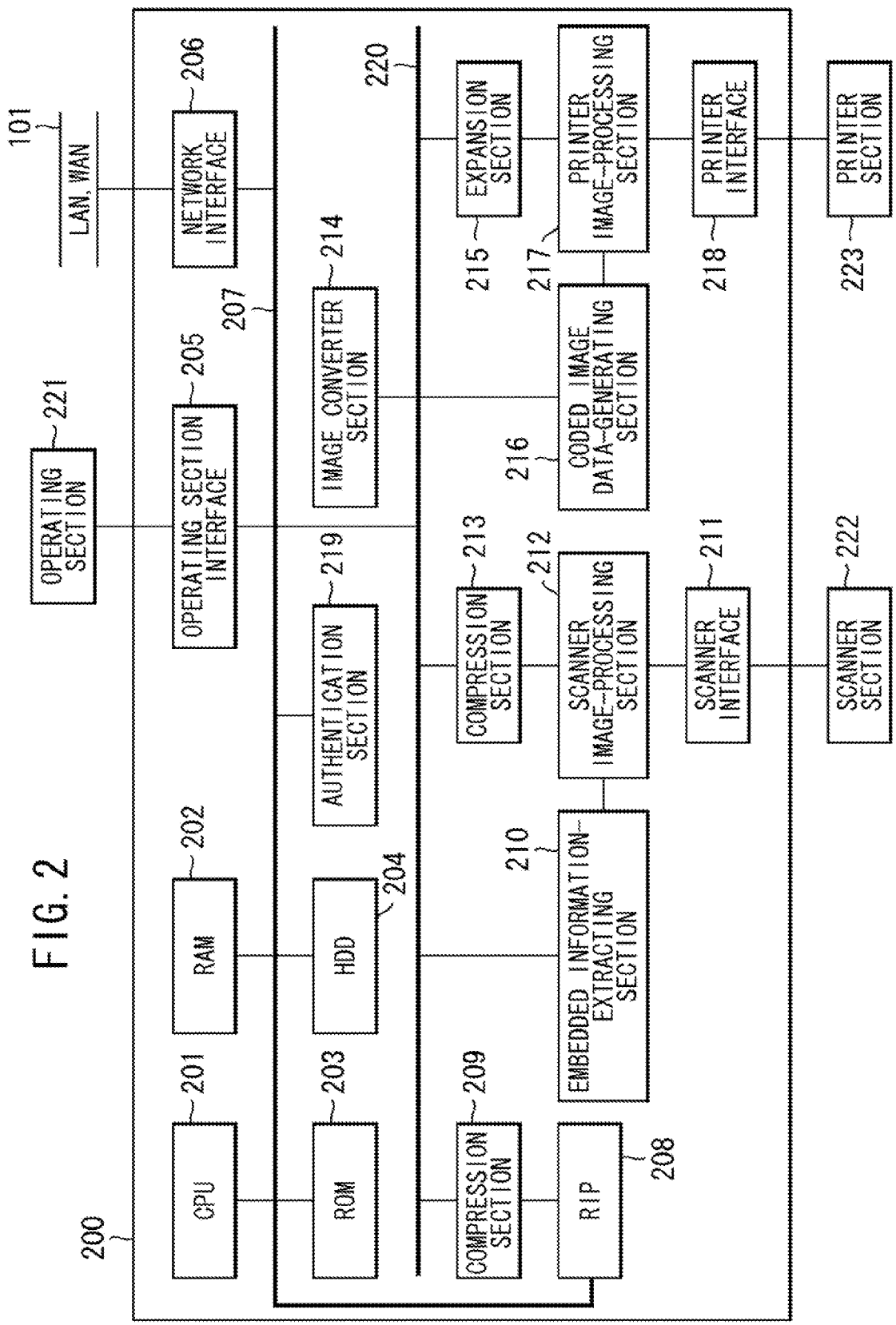
FIG. 2 is a schematic block diagram of a configuration common to multifunction peripherals appearing in FIG. 1.

FIG. 2 is a schematic block diagram of a configuration common to the MFPs appearing in FIG. 1.

As shown in FIG. 2, each of the MFPs 104 and 105 is comprised of a controller 200, an operating section 221, the scanner section 222, and a printer section 223.

Next, a description will be given of a configuration of the controller 200. In the controller 200, a CPU 201 performs centralized control of accesses to various devices of the controller 200 connected to a system bus 207 as well as various kinds of processing carried out within the controller 200, according to control programs stored in a ROM 203 or an HDD 204.

A RAM 202 serves not only as a system work memory for operation of the CPU 201, but also as a memory for temporarily storing image data. The ROM 203 stores a boot program and the like for the apparatus. The HDD 204 is a hard disk drive capable of storing system software and image data.

An operating section interface 205 provides interface for connection between the system bus 207 and the operating section 221. The operating section interface 205 receives image data to be displayed on the operating section 221 via the system bus 207, and outputs the received image data to the operating section 221. Further, the operating section interface 205 outputs information input from the operating section 221 to the system bus 207.

A network interface 206 is connected to the network 101, such as a LAN and a WAN, and the system bus 207, for bidirectionally transmitting and receiving data to and from external devices. An image bus 220 is a transmission path for transmitting and receiving image data, and is formed by a PCI bus or an IEEE 1394.

A scanner image-processing section 212 corrects, processes, and edits image data received from the scanner section 222 via a scanner interface 211. An embedded information-extracting section 210 detects a pattern embedded in a background image of image data, or extracts additional information from image data.

A compression section 213 receives image data and compresses the same. An expansion section 215 expands data, and then converts the expanded data into raster image data to deliver the same to a printer image-processing section 217.

The printer image-processing section 217 receives image data delivered from the expansion section 215, and performs image processing on the image data while referring to attribute data added to the image data. Further, the printer image-processing section 217 synthesizes the image data with coded image data generated by a coded image data-generating section 216, when instructed to do so.

The coded image data-generating section 216 generates coded image data, such as a two-dimensional code image, a barcode image, and an image generated by an information embedding technique. Images are formed using information read by the CPU 201 via a memory card slot, not shown, or input via the operating section 221.

It should be noted that coded images are generated by executing programs stored in the RAM 202. Image data subjected to image processing is output to the printer section 223 via a printer interface 218.

An image converter section 214 performs a predetermined conversion process, such as image rotation, color space conversion, binary/multivalue conversion, image superimposing, and thinning-out, on image data.

A RIP 208 receives intermediate data generated based on PDL code data, and generates bitmap data (multivalue data). The generated bitmap data is compressed by a compression section 209 and is delivered to the image bus 220.

An authentication section (authenticating unit) 219 authenticates not only a user that uses user information input via the operating section 221 and a workgroup to which the user belongs, but also a print job.

Figure 3:
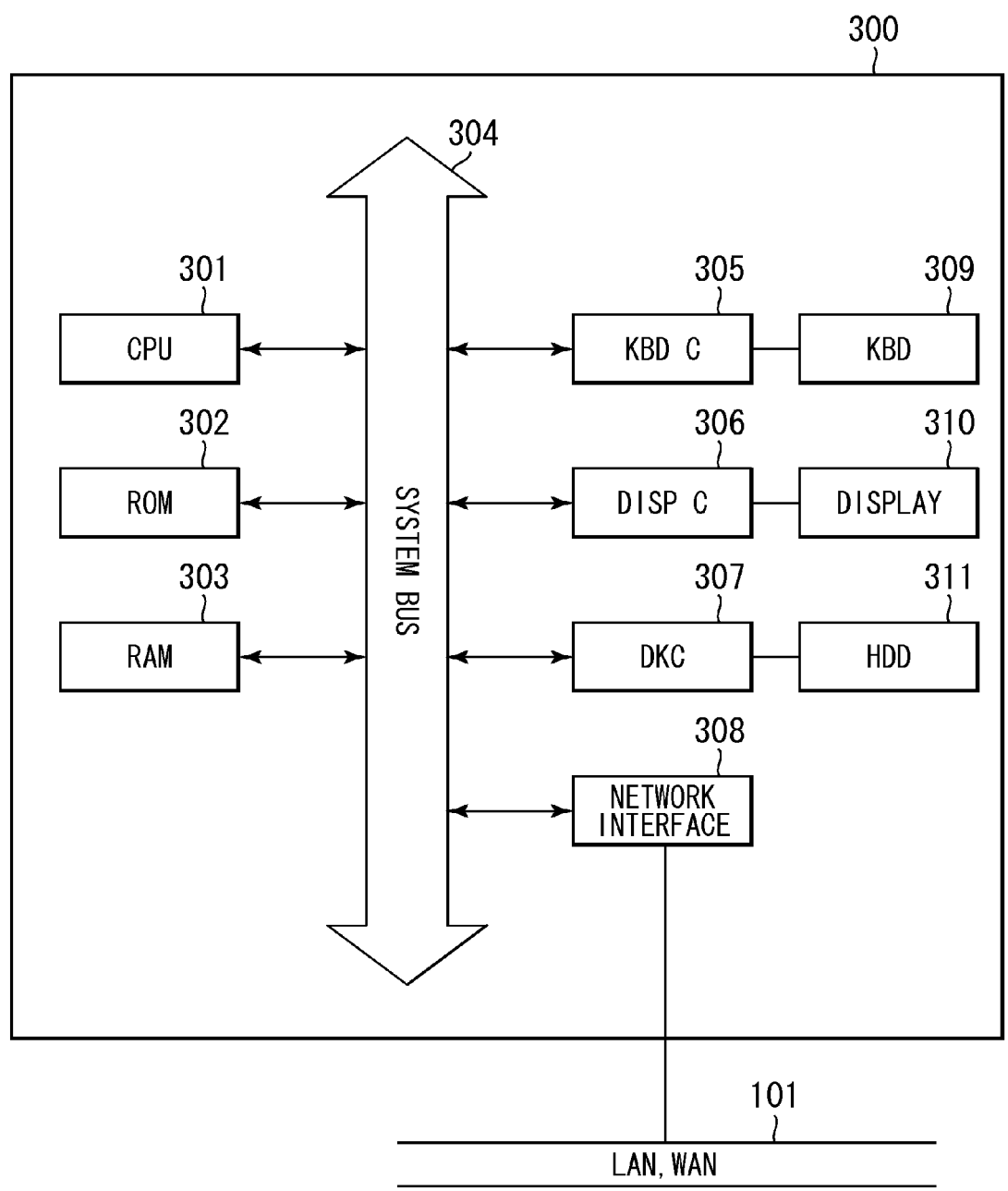
FIG. 3 is a schematic block diagram of a configuration of a computer system common to client computers, a file server, and an approval information management server, appearing in FIG. 1.

FIG. 3 is a schematic block diagram of a configuration common to the client computers, the file server, and the approval information management server, appearing in FIG. 1.

In the present embodiment, the client computers 102 and 103, the file server 106, and the approval information management server 107 are all assumed to have the configuration shown in FIG. 3. Hereinafter, they will be generically referred to as "the computer system 300". The computer system 300 includes a CPU 301 for executing software stored in a ROM 302 or an HDD 311. The CPU 301 performs centralized overall control of all the devices connected to a system bus 304.

A RAM 303 functions as a main memory and a work area or the like of the CPU 301. A keyboard controller (KBD C) 305 controls instruction inputs from a keyboard (KBD) 309. A display controller (DISP C) 306 controls display on a display module (DISPLAY) 310 implemented e.g. by a liquid crystal display A disk controller (DKC) 307 controls the HDD 311 as a large-capacity storage device. A network interface 308 bidirectionally transmits and receives data to and from external devices via the network 101 such as a LAN and a WAN.

Further, the file server 106 stores a check-in/check-out process program in the ROM 302 or the HDD 311, for realizing a document management mechanism by executing a check-in /check-out process, described hereinafter with reference to FIG. 4.

Figure 4:
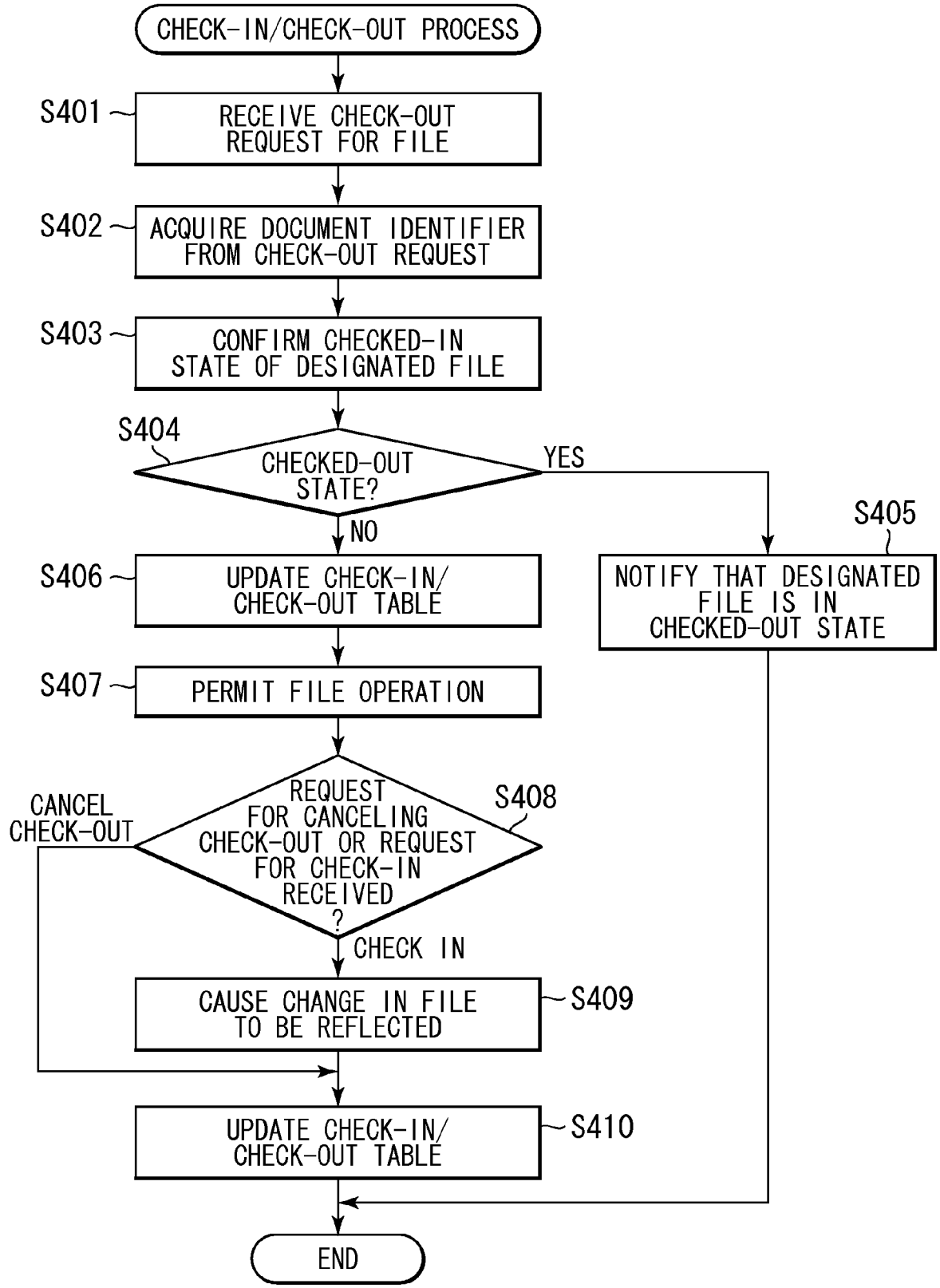
FIG. 4 is a flowchart of a check-in/check-out process executed by the file server.

FIG. 4 is a flowchart of the check-in/check-out process executed by the file server 106.

Figure 5:
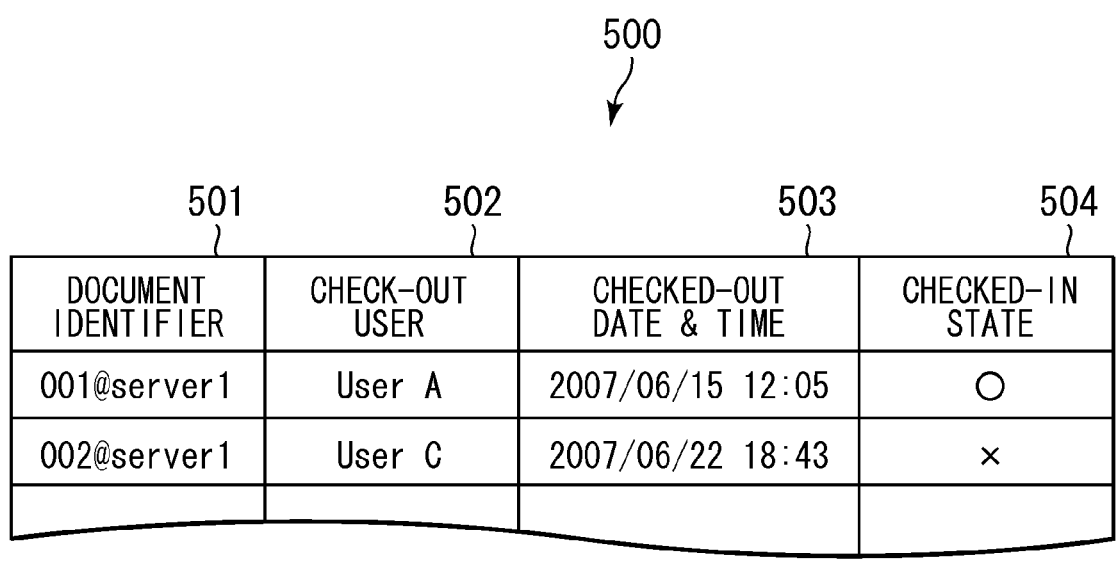
FIG. 5 is a view showing an example of a check-in/check-out table stored in the file server.

Here, the file server 106 includes a document management database, not shown, which includes a check-in/check-out table 500 shown in FIG. 5.

The check-in/check-out table 500 includes items of a document identifier 501, a check-out user 502, a checked-out date and time 503, and a checked-in state 504. In the column of the checked-in state 504, "o" represents a state where the associated file is checked in, and "xx" represents a state where the associated file is not checked in (i.e. the file is checked out). The check-in/check-out table 500 stores access control information which is registered in association with each file, for use in determining whether or not to permit access to the file.

Referring to FIG. 4, first, in the step S401, the file server 106 receives a file check-out request for checking out a file stored therein, from the client computer 102 or 103. The check-out request may be issued from the MFP 104 or 105. The file server 106 analyzes the check-out request received in the step S401, and acquires a document identifier for identifying a file to be checked out (step S402).

The file server 106 looks up the check-in/check-out table 500 shown in FIG. 5 according to the acquired document identifier, to thereby confirm a checked-in state of a file (document) designated by the identifier (steps S403 and S404).

If the file server 106 determines in the step S404 that the file is in the checked-out state, the file server 106 notifies the client computer 102 or 103 in the step S405 that the designated file (document) is in the checked-out state, followed by terminating the present process. That is, the file server 106 prohibits (or restricts) editing of the designated file (document) from the client computer 102 or 103 which has issued the check-out request.

If the file server 106 determines in the step S404 that the file is not in the checked-out state, the file server 106 updates the items (the checked-out date and time 503 and the checked-in state 504) of the designated file (document) of the check-in/check-out table 500 (step S406). Then, the file server 106 allows the client computer 102 or 103 having issued the check-out request to edit the file (step S407).

When the file server 106 receives a request from the client computer 102 or 103 again, the file server 106 determines whether the request is for canceling check-out of the file or for checking in the same (step S408).

If the file server 106 determines in the step S408 that the request is for canceling check-out of the file, the file server 106 updates the check-in/check-out table 500 (step S410), followed by terminating the present process.

If the file server 106 determines in the step S408 that the request is for checking in the file, the file server 106 causes a change in the file in the checked-out state to be reflected on the file stored in the file server 106, in a step S409, and updates the check-in/check-out table 500 in the step S410, followed by terminating the present process.

Figure 6:
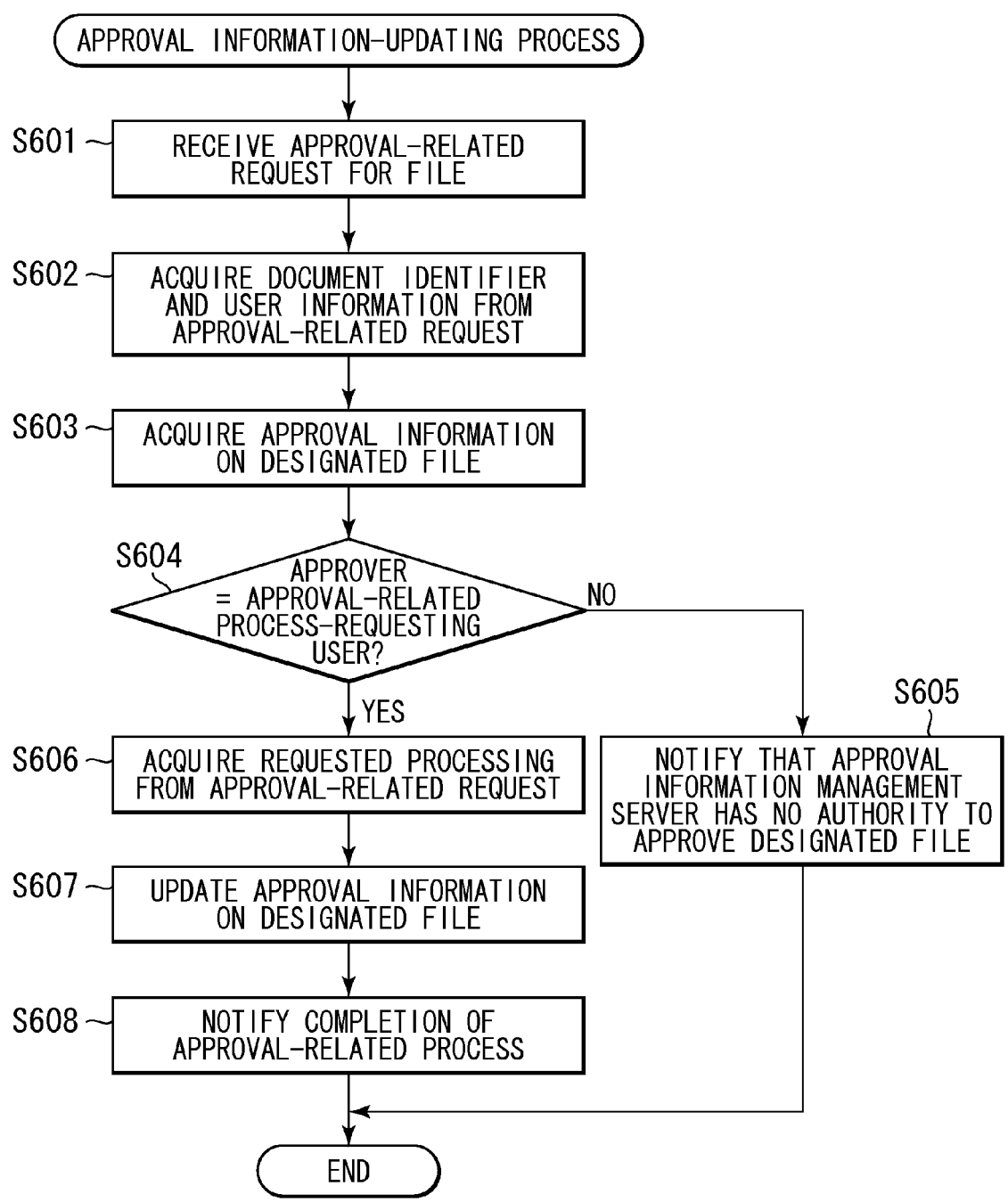
FIG. 6 is a flowchart of an approval information-updating process executed by the approval information management server, for updating approval information in response to an approval-related request for a designated file.

FIG. 6 is a flowchart of an approval information-updating process executed by the approval information management server 107 appearing in FIG. 1, for updating approval information in response to an approval-related request for a designated file.

Here, the approval information management server 107 stores approval information 700 shown in FIG. 7 in the HDD 311. The approval information 700 includes items of a document identifier 701, approver (ID) 702, an updated date and time 703 at which approval information was updated, and approved/unapproved information 704 indicative of an approved/rejected/unapproved state of the associated file as the result of an approval-related process. In the column of the approved/unapproved information 704, "o" represents an approved state of the associate file, and "x" represents a rejected state in which the approval of the associated file is rejected. Further, "-" represents an unapproved state of the associated file. When the approved/unapproved information 704 is updated, information in the associated box of the column of the updated date and time 703 is updated to the date and time at which the approved/unapproved information 704 is updated.

Referring to FIG. 6, first, in the step S601, the approval information management server 107 receives an approval-related request 800, shown in FIG. 8, which requests approval of a file stored in the file server 106, from the client computer 102 or 103 or the MFP 104 or 105.

The approval-related request 800 contains items of a document identifier 801 for identifying a file for approval, requested processing 802 of a file identified by the document identifier 801, and an approval-related process-requesting user 803 who is performing the approval-related process on the file.

The approval information management server 107 analyzes the approval-related request 800 received in the step S601 to thereby acquire the document identifier 801 and the approval-related process-requesting user 803 of the file (step S602).

The approval information management server 107 collates the document identifier 801 acquired in the step S602 and the approval information 700, for acquiring apiece of approval information 700 in a row including the document identifier 701 matching the document identifier 801 of the designated file (step S603).

The approval information management server 107 obtains the approver 702 of the designated file from the approval information 700, and determines whether or not the approver 702 coincides with the approval-related process-requesting user 803 acquired from the approval-related request 800 (step S604).

If the approval information management server 107 determines in the step S604 that the approver 702 does not coincide with the approval-related process-requesting user 803, the approval information management server 107 notifies the client computer 102 or 103 or the MFP 104 or 105, which issued the approval-related request 800, that the approval information management server 107 has no authority to approve the designated file (step S605), followed by terminating the present process.

If the approval information management server 107 determines in the step S604 that the approver 702 coincides with the approval-related process-requesting user 803, the approval information management server 107 acquires the requested processing 802 of the designated file from the approval-related request 800 in the step S606, and updates the approver 702, updated date and time 703, and approved/unapproved information 704 of the piece of approval information 700 in the row including the document identifier 701 of the designated file (step S607).

Then, the approval information management server 107 notifies the client computer 102 or 103 or the MFP 104 or 105 of completion of the approval-related process (step S608), followed by terminating the present process.

Figure 9:
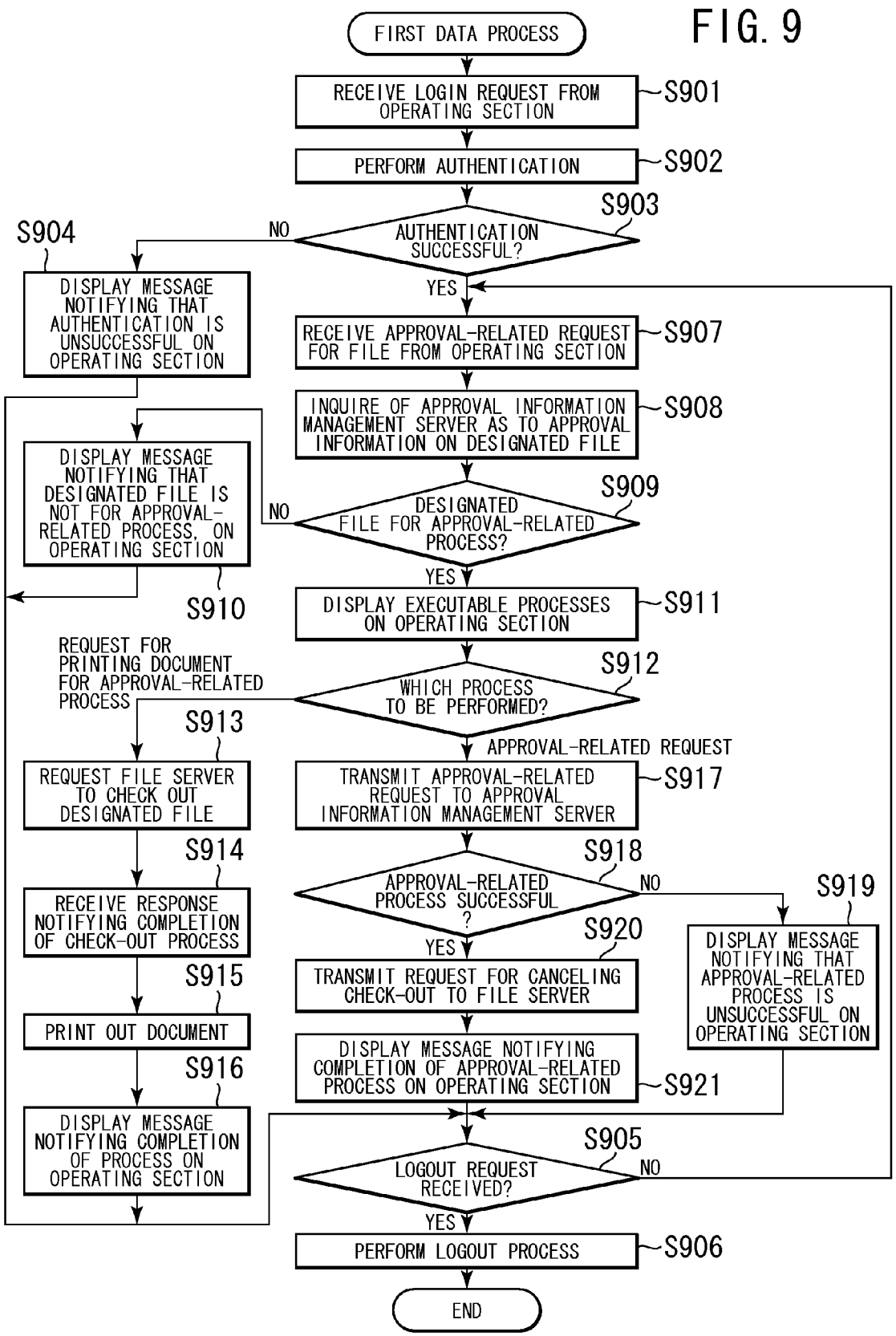
FIG. 9 is a flowchart of a first data process executed by each multifunction peripheral appearing in FIG. 1.

FIG. 9 is a flowchart of a first data process executed by each MFP appearing in FIG. 1.

Figure 10:
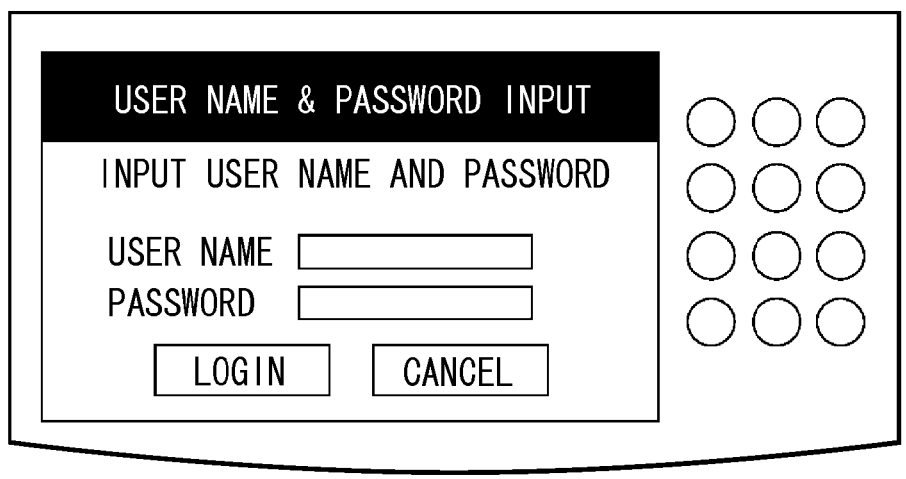
FIG. 10 is a view showing an example of a user information input screen for login, displayed on an operating section, appearing in FIG. 2, of the multifunction peripheral.

First, in the step S901, the MFP receives a login request together with user information (a user name and a password) input by the user via the operating section 221 of the MFP and acquires the user information (see FIG. 10).

The authentication section 219 performs user authentication using the user information acquired in the step S901 (step S902). It should be noted that a user database with reference to which the user authentication is performed may be stored in the MFP 104 or 105, or in an authentication server connected to the MFP via a network, not shown (in the latter case, in the step S902, the authentication server is requested to perform the user authentication).

Figure 11:
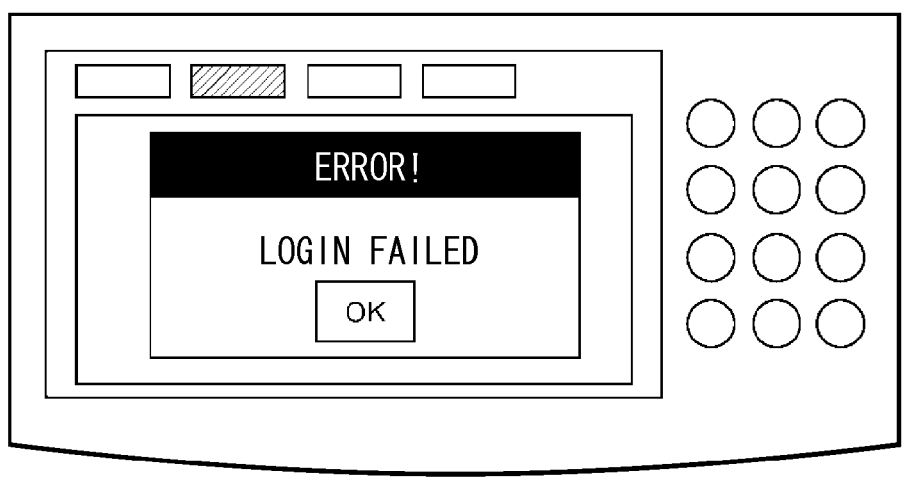
FIG. 11 is a view showing an example of a screen displayed on the operating section, for notifying that an authentication process has been unsuccessful.

In the step S903, the MFP determines whether or not the authentication in the step S902 has been successful. If the MFP determines that the authentication is not successful, the MFP displays a message notifying the user of the fact on the screen shown in FIG. 11 via the operating section 221 (step S904), and performs steps S905 et seq. If it is determined that the authentication has been successful, the process proceeds to the step S907.

In the step S907, the MFP receives an approval-related request for the file designated by the user, from the operating section 221.

Then, the MFP acquires the document identifier of the designated file, and makes an inquiry to the approval information management server 107 about whether or not the designated file is for the approval-related process, and receives a response to the inquiry from the approval information management server 107 (step S908).

In the step S909, the MFP determines whether or not the designated file is for the approval-related process, based on the contents of the response from the approval information management server 107. If the MFP determines that the designated file is not for the approval-related process, the MFP notifies the user of the fact, in the step S910, and performs the steps S905 et seq.

Figure 12:
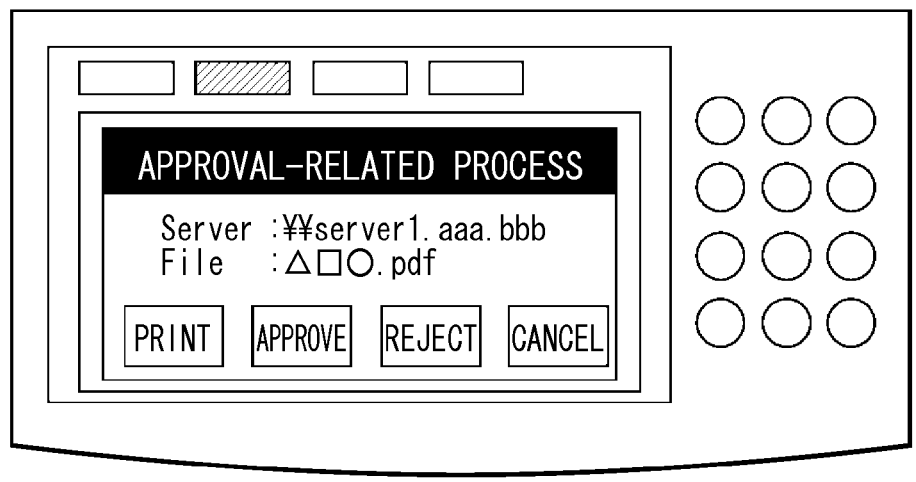
FIG. 12 is a view showing an example of a screen displayed on the operating section, for selecting an approval-related process.

If the MFP determines in the step S909 that the designated file is for the approval-related process, the MFP displays executable processes on the screen shown in FIG. 12 via the operating section 221, for selection by the user (step S911).

Then in the step S912, the MFP receives a request of a process selected by the user from the operating section 221, to thereby determine a process to be executed.

If the MFP determines in the step S912 that printing of the designated file for the approval-related process is requested, the MFP transmits a request for checking out the designated file to the file server 106 (step S913).

In the step S914, the MFP receives a check-out completion response indicative of completion of the process from the file server 106 as a response to the check-out request for the designated file, whereafter the MFP prints the designated file by the printer section 223 in the step S915.

Upon completion of the printing, in the step S916, the MFP displays a message notifying the user of the fact via the operating section 221, and proceeds to the step S905.

If the MFP determines in the step S912 that the approval-related process of the designated file is requested, the MFP creases such an approval-related request 800 as shown in FIG. 8 based on the document identifier and requested processing of the designated file, and user information acquired from the result of the user authentication. Then, the MFP transmits the approval-related request 800 to the approval information management server 107 (step S917).

The MFP receives a response to the request transmitted in the step S917, from the approval information management server 107, and determines whether or not the approval-related process has been successful (step S918) For example, the MFP receives a notification that the approval-related process has been successful, or a notification that the approval-related process has been unsuccessful, from the approval information management server 107, and determines based on the received notification whether or not the approval-related process has been successful.

Figure 13:
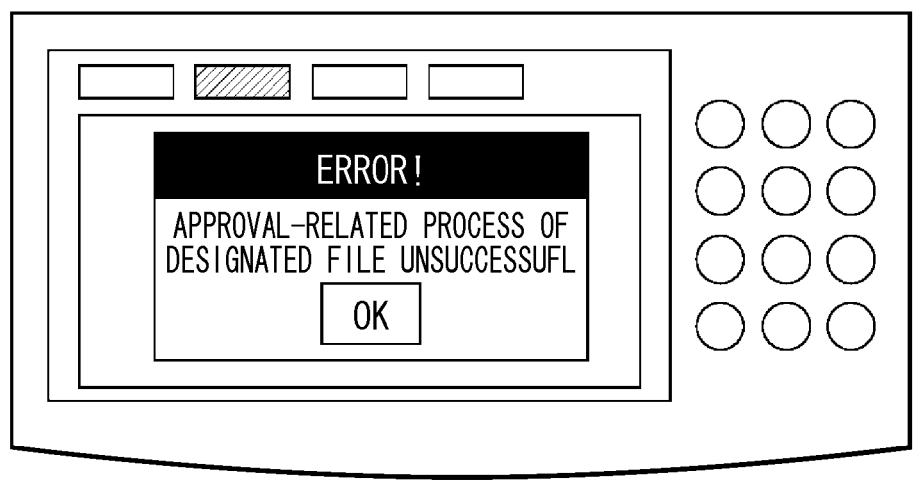
FIG. 13 is a view showing an example of a screen displayed on the operating section, for notifying that the approval-related process has been unsuccessful.

If the MFP determines in the step S918 that the approval-related process has been unsuccessful, the MFP displays a message notifying the user of the fact on the screen shown in FIG. 13 via the operating section 221 (step S919), and performs the steps S905 et seq.

If the MFP determines in the step S918 that the approval-related process has been successful, the MFP transmits a request for canceling the check-out of the file having been subjected to the approval-related process, to the file server 106 (step S920).

Figure 14:
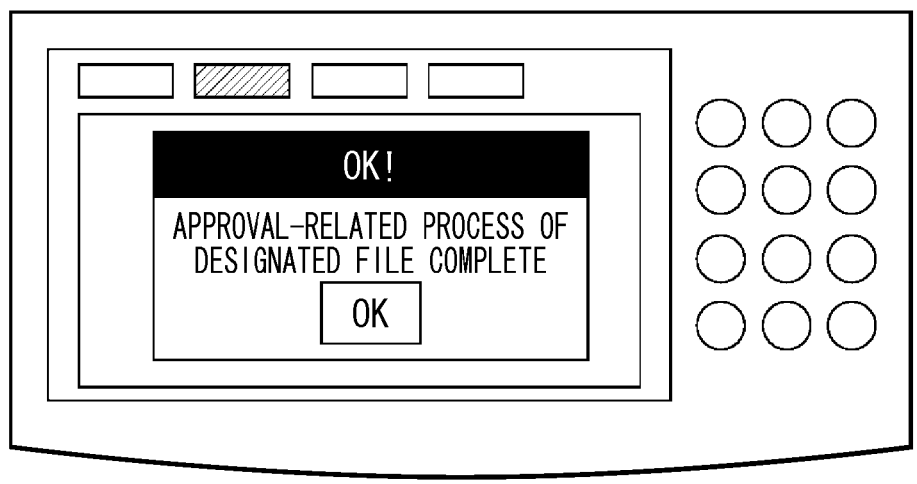
FIG. 14 is a view showing an example of a screen displayed on the operating section, for notifying that the approval-related process has been successful

In the step S921, the MFP displays a message to the effect that the approval-related process has been completed, on the screen shown in FIG. 14 via the operating section 221, and performs the steps S905 et seq.

In the step S905, the MFP determines whether or not it has received a logout request from the user. If the MFP determines that the logout request has not received a logout request, the process returns to the step S907.

If the MFP determines in the step S905 that it has received the logout request, the MFP performs a logout process in the step S906, followed by terminating the present process.

According to the present embodiment, when the approval-related process is performed on one of files which are stored in the file server 106 and are shared between a plurality of users, it is possible to prohibit (or restrict) editing the file by a user other than an approver during a time period between when the approver prints out the file and when the approval-related process is carried out on the file.

More specifically, it is possible to prevent a mismatch from being caused between a file of which the contents have been confirmed for approval and a file stored in the file server 106, for approval. This makes it possible to enhance the reliability of the approval workflow without the approver being aware of it.

Next, a second embodiment of the present invention will be described with reference to FIGS. 16 to 19. The present embodiment is distinguished from the first embodiment only in that a valid check-out time period is provided and while monitoring whether or not the check-out of a file designated for the approval-related process has been timed out, an approval-related request process etc., described hereinafter, are executed, and the other configuration is the same as that of the first embodiment, so that component elements corresponding to those of the approval workflow system according to the first embodiment are designated by identical reference numerals, and detailed description thereof is omitted. FIG. 16 is a flowchart of a time out-monitoring process executed by the file server. The file server 106 is assumed to be capable of executing not only the check-in/check-out process in FIG. 4 but also this time out-monitoring process.

Now, the file server 106 has a time out-monitoring table 1700 shown in FIG. 17 stored in the HDD 311. The time out-monitoring table 1700 includes items of a document identifier 1701, a check-out user 1702, and a valid check-out period 1703.

First, in the step S1601, the file server 106 checks the time out-monitoring table 1700. If the file server 106 determines in the step S1602 that there is no file the check-out of which has been timed out, i.e. there is no file of which the expiry data of the valid check-out period 1703 has been reached, the process proceeds to the step S1604.

If the file server 106 determines in the step S1602 that there is a file of which the expiry data of the valid check-out period 1703 has been reached, there is executed the following process: A request for canceling the check-out of the file which has been timed out is transmitted to the check-in/check-out process program (program for executing the FIG. 4 process) stored in the file server 106 (step S1603).

In the step S1604, the file server 106 suspends the process until a predetermined time period has elapsed, and then determines in the step S1605 whether or not the time out-monitoring process is to be terminated.

If it is determined in the step S1605 that the time out-monitoring process is to be terminated, the process is terminated, whereas if it is determined in the step S1605 that the time out-monitoring process is not to be terminated, the process returns to the step S1601, wherein the process from the step S1601 to the step S1605 is repeatedly carried out.

Figure 18:
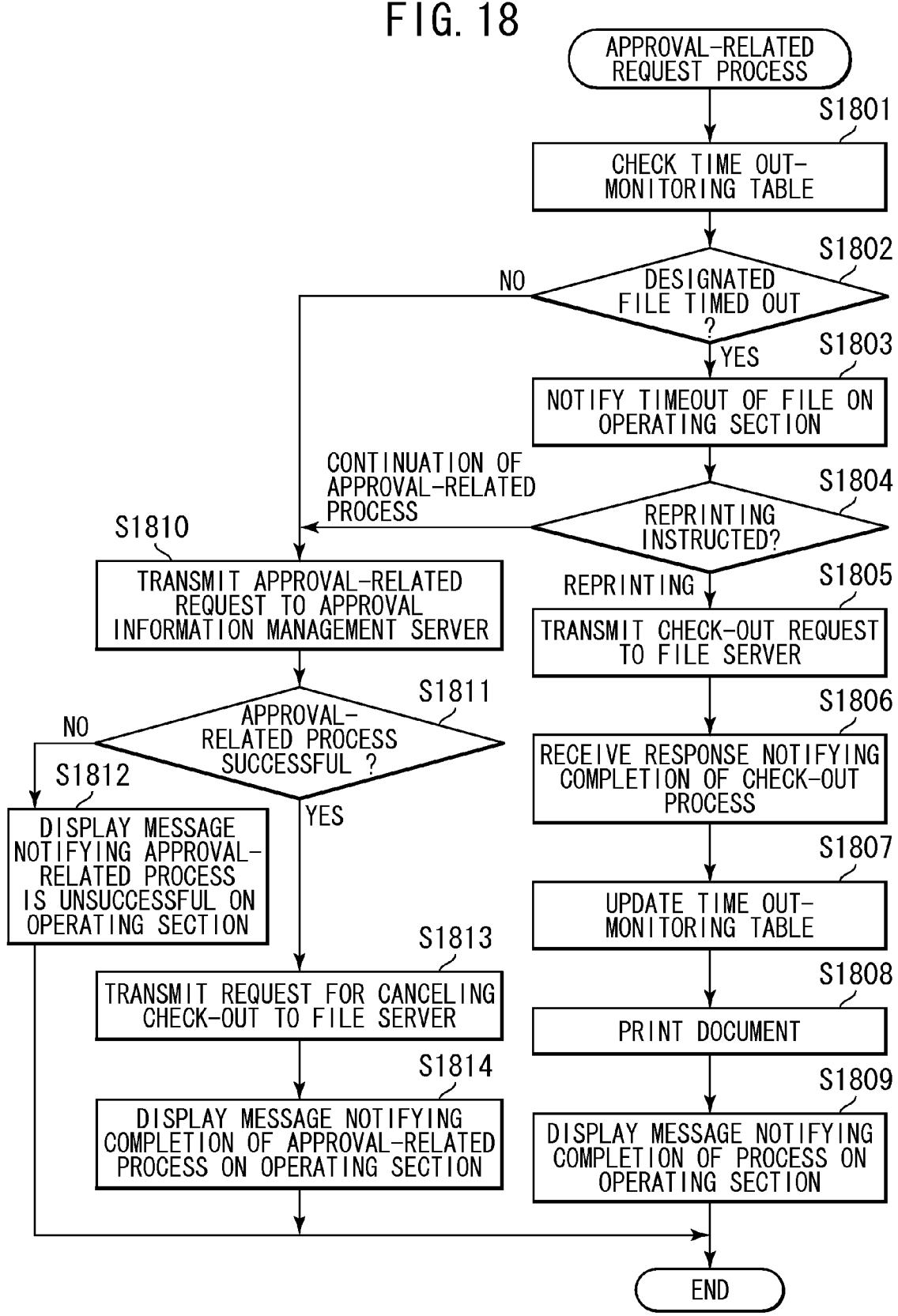
FIG. 18 is a flowchart of an approval-related request process executed by the multifunction peripheral, when requesting the approval information management server to perform the approval-related process.

FIG. 18 is a flowchart of an approval-related request process executed by each MFP appearing in FIG. 1, in a step S1918 in a second data process, described hereinafter with reference to FIG. 19, for requesting the approval information management server 107 to perform the approval-related process.

First, in the step S1801, the MFP checks the time out-monitoring table 1700. More specifically, the MFP makes an inquiry to the file server 106 about whether the file which was checked out for the approval-related request and was printed out by the MFP in the past is still in a checked-out state or the check-out has been timed out, and receives a response to the inquiry from the file server 106. In the step S1802, the MFP determines whether or not the check-out of the designated file has already been timed out, i.e. the checked-out state thereof is canceled, based on the response from the file server 106.

If the MFP determines in the step S1802 that the check-out of the designated file has not been timed out, the MFP performs steps S1810 et seq.

Figure 15:
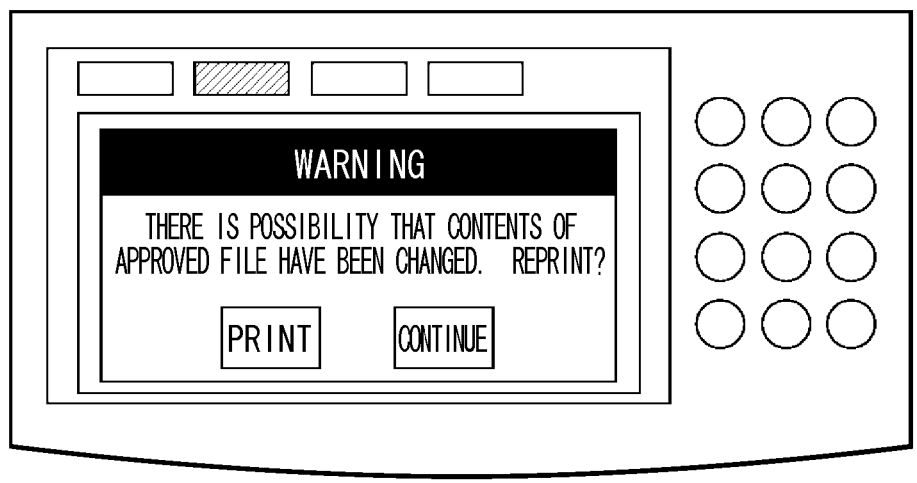
FIG. 15 is a view showing an example of a screen displayed on the operating section, for notifying that a valid check-out period for a designated file has expired.

If the MFP determines in the step S1802 that the check-out of the designated file has been timed out, the MFP displays a message to the effect that the contents of the designated file have been changed due to the time-out of the check-out, via the operating section 221. Then, the MFP prompts the user to select between continuation of the approval-related process and reprinting of the file on the screen shown in FIG. 15 (step S1803).

In the step S1804, the MFP determines which of the reprinting or the continuation of the approval-related process has been selected. If it is determined that the continuation of the approval-related process has been selected, the process proceeds to the step S1810.

If the MFP determines in the step S1804 that the reprinting has been selected, the MFP transmits a check-out request to the file server 106 in the step S1805.

When the MFP receives, in the step S1806, a response to the check-out request to the effect that the check-out process has been completed, the MFP updates the time out-monitoring table 1700 (step S1807), and prints the designated file by the printer section 223 (step S1808).

When the printing is completed, the MFP displays a message notifying the user of the fact on the operating section 221 (step S1809), followed by terminating the present process.

On the other hand, in the step S1810, the MFP creates such an approval-related request 800 appearing in FIG. 8 based on the document identifier and requested processing of the designated file, and user information acquired from the result of the user authentication. Then, the MFP transmits the approval-related request 800 to the approval information management server 107.

The MFP receives a response to the request transmitted in the step S1810, from the approval information management server 107, and determines whether or not the approval-related process has been successful (step S1811).

If the MFP determines in the step S1811 that the approval-related process has been unsuccessful, the MFP displays a message notifying the user of the fact on the screen shown in FIG. 13 via the operating section 221 (step S1812), followed by terminating the present process.

If the MFP determines in the step S1811 that the approval-related process has been successful, the MFP transmits a request for canceling check-out of the file having been subjected to the approval-related process, to the file server 106 (step S1813).

In the step S1814, the MFP displays a message to the effect that the approval-related process has been completed, on the screen shown in FIG. 14 via the operating section 221, and terminates the present process.

Figure 19:
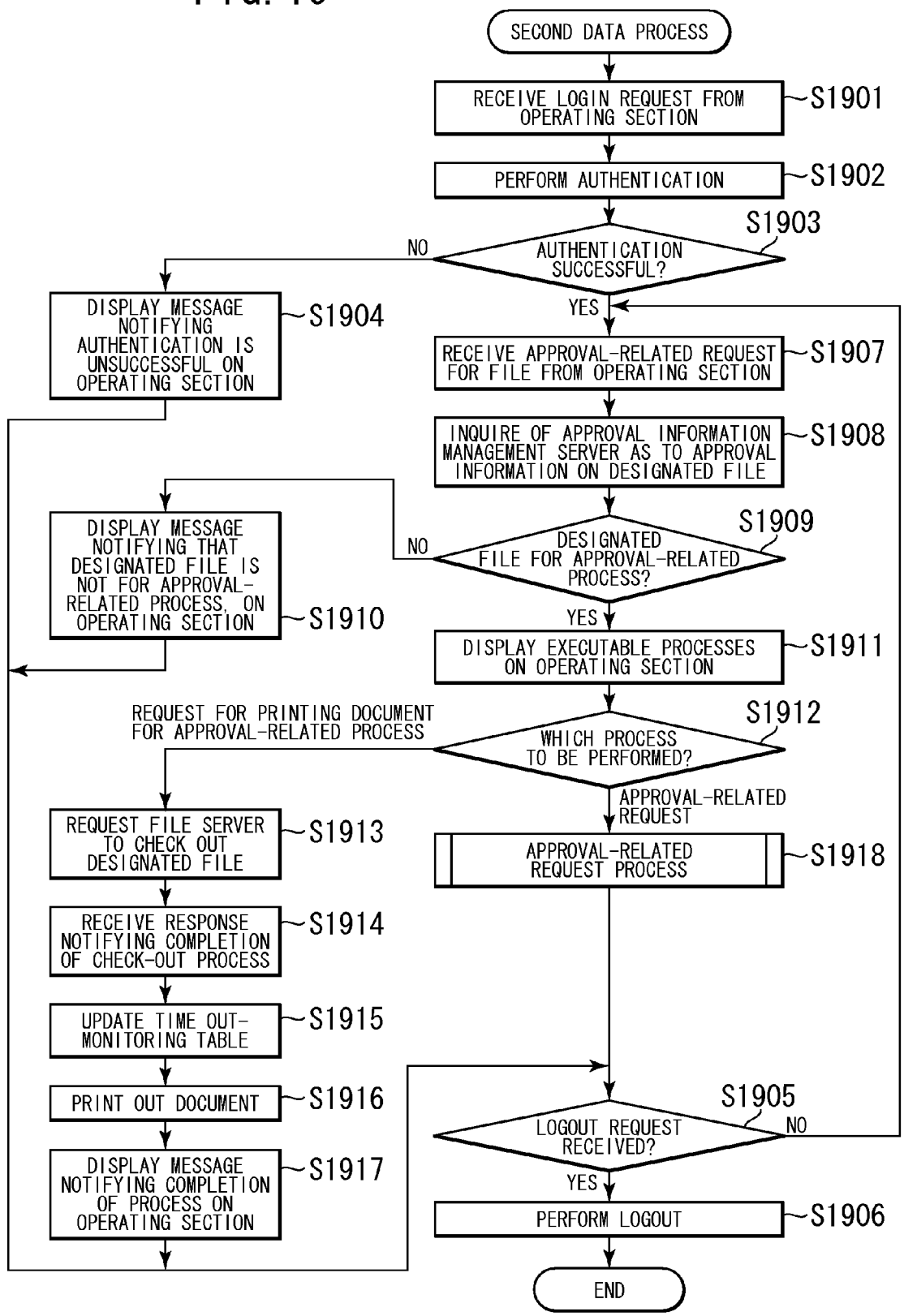
FIG. 19 is a flowchart of a second data process executed by the multifunction peripheral shown in FIG. 2.

FIG. 19 is a flowchart of the second data process executed by each MFP appearing in FIG. 1. In the second data process, the time out-monitoring table 1700 shown in FIG. 17 is assumed to be stored in the HDD 204 of the MFP 104 or 105.

First, in a step S1901, the MFP receives a login request together with user information (a user name and a password) input by a user via the operating section 221, and acquires the user information (see FIG. 10).

The authentication section 219 performs user authentication using the user information acquired in the step S1901 (step S1902). Similarly to the first embodiment described above, the user database with reference to which the user authentication is performed may be stored in the MFP 104 or 105, or in an authentication server connected to the MFP via the network, not shown (in the latter case, in the step S1902, the authentication server is requested to perform the user authentication).

In a step S1903, the MFP determines whether or not the authentication in the step S1902 has been successful. If the MFP determines that the authentication has been unsuccessful, the MFP displays a message notifying the user of the fact on the screen shown in FIG. 11 via the operating section 221 (step S1904), and performs steps S1905 et seq.

If it is determined in the step S1903 that the authentication has been successful, the process proceeds to a step S1907, wherein the MFP receives an approval-related request for the file designated by the user, from the operating section 221.

Then, the MFP acquires the document identifier of the designated file, and makes an inquiry to the approval information management server 107 about whether or not the designated file is for the approval-related process (step S1908).

In a step S1909, the MFP determines whether or not the designated file is for the approval-related process. If the MFP determines that the designated file is not for the approval-related process, the MFP notifies the user of the fact in a step S1910, and performs the steps S1905 et seq.

If the MFP determines in the step S1909 that the designated file is for the approval-related process, the MFP displays executable processes on the screen shown in FIG. 12 via the operating section 221, for selection by the user (step S1911).

In a step S1912, the MFP receives a request of a process selected by the user from the operating section 221, to thereby determine a process to be executed.

If the MFP determines in the step S1912 that printing of the designated file for the approval-related process is requested, the MFP transmits a request for checking out the designated file to the file server 106 (step S1913).

In a step S1914, when the MFP receives a check-out completion response indicative of completion of the process from the file server 106 as a response to the check-out request, the MFP updates the time out-monitoring table in a step S1915, and prints the designated file by the printer section 223 in a step S1916.

Upon completion of the printing, in a step S1917, the MFP displays a message notifying the user of the fact via the operating section 221, and performs the steps S1905 et seq.

If the MFP determines in the step S1912 that the approval-related process of the designated file is requested, the MFP executes the approval-related request process described above with reference to FIG. 18 (step S1918), and then executes the steps S1905 et seq.

In the step S1905, the MFP determines whether or not the MFP has received the logout request from the user. If the MFP determines that the MFP has not received the logout request, the process returns to the step S1907.

If the MFP determines in the step S1905 that it has received the logout request, the MFP performs a logout process in a step S1906, followed by terminating the present process.

As described hereinabove, according to the present embodiment, by providing the valid check-out period, it is possible to prevent editing of a file stored in the file server 106 from continuing to be prohibited (or restricted) for a long time period.

Further, only the approval-related request for a file of which the valid check-out period has expired and of which the check-out has been canceled accordingly is given a notice to the effect. This makes it possible to prevent a file with the possibility of being further edited from being erroneously approved. In short, it is possible to enhance the reliability of the approval workflow without degrading usability.

It is to be understood that the present invention may also be accomplished by supplying a system or an apparatus with a computer-readable storage medium in which a program code of software, which realizes the functions of any of the above described embodiments, is stored, and causing a computer (or CPU or MPU) of the system or apparatus to read out and execute the program code stored in the computer-readable storage medium.

In this case, the program code itself read from the computer-readable storage medium realizes the functions of any of the above described embodiments, and therefore the program code and the computer-readable storage medium in which the program code is stored constitute the present invention.

Examples of the computer-readable storage medium for supplying the program code include a floppy (registered trademark) disk, a hard disk, a magnetic-optical disk, an optical disk, such as a CD-ROM, a CD-R, a CD-RW, a DVD-ROM, a DVD-RAM, a DVD-RW, or a DVD+RW, a magnetic tape, a nonvolatile memory card, and a ROM. Alternatively, the program may be downloaded via a network.

Further, it is to be understood that the functions of any of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of any of the above described embodiments may be accomplished by writing a program code read out from the computer-readable storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and function.

This application claims priority from Japanese Patent Application No. 2008-019055 filed Jan. 30, 2008, which is hereby incorporated by reference herein in its entirety.

What is claimed is:

1. An approval workflow management system in which a file server that stores files and controls access to the files, a printing apparatus that prints out files stored in the file server, and an approval information management server that manages approval information which is indicative of an approval-related state of each file stored in the file server, are connected to a network, wherein the printing apparatus comprises:
a first request unit adapted to request, in response to acceptance of a request for printing one of the files stored in the file server, the file server to restrict editing the one of the files stored in the file server;
a second request unit adapted to request the approval information management server to approve the file;
a third request unit adapted to request, in response to receiving from the approval information management server a notification that a process for approval responsive to the request for approval of the file by the second request unit has been successful, the file server to cancel restriction of editing the file; and
a determination unit adapted to determine whether or not the file requested to be printed is a document for approval, wherein if the determination unit determines that the file requested to be printed is a document for approval, the first request unit requests the file server to restrict editing the file, and wherein the file server manages access control information for managing whether to permit or restrict access to each file, in a manner associated with each of the files stored therein, and in response to the request by the first request unit, updates a piece of the access control information associated with the file requested by the first request unit, such that editing of the file is restricted.

2. The approval workflow management system according to claim 1, wherein the approval information contains approver information on approvers who approve the files, wherein the printing apparatus includes an authenticating unit adapted to perform user authentication, and wherein the approval information management server includes an approver-determining unit adapted to determine whether or not a result of the user authentication by the authenticating unit coincides with an approver registered in the approval information.

3. The approval workflow management system according to claim 2, wherein the approval information management server updates the approval information only when the approver-determining unit determines that the result of the user authentication by the authenticating unit coincides with the approver registered in the approval information.

4. The approval workflow management system according to claim 1, wherein when a predetermined time period has elapsed after the first request unit requesting the file server to restrict editing the file, the file server permits editing the file.

* * * * *